US012770151B2

(12) United States Patent
Tax et al.

(10) Patent No.: US 12,770,151 B2
(45) **Date of Patent: *Oct. 20, 2026**

(54) VALUE TRANSFER CARD MANAGEMENT SYSTEM

(71) Applicant: The Toronto-Dominion Bank, Toronto (CA)

(72) Inventors: David Samuel Tax, Toronto (CA); Milos Dunjic, Oakville (CA); Kushank Rastogi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,096

(22) Filed: Jan. 14, 2025

(65) Prior Publication Data

US 2025/0156876 A1 May 15, 2025

Related U.S. Application Data

(63) Continuation of application No. 17/016,436, filed on Sep. 10, 2020, now Pat. No. 12,236,433.

(51) Int. Cl.
*G06Q 20/40* (2012.01)
*G06Q 20/10* (2012.01)
(Continued)

(52) U.S. Cl.
CPC ....... *G06Q 20/405* (2013.01); *G06Q 20/1085* (2013.01); *G06Q 20/204* (2013.01);
(Continued)

(58) Field of Classification Search
CPC ............. G06Q 20/405; G06Q 20/1085; G06Q 20/204; G06Q 20/206; G06Q 20/227;
(Continued)

(56) References Cited

U.S. PATENT DOCUMENTS 7,805,333 B2 9/2010 Kepecs
7,980,464 B1 7/2011 Sarris et al.
(Continued)

FOREIGN PATENT DOCUMENTS

CN 202677514 1/2013
CN 107862525 3/2018
(Continued)

OTHER PUBLICATIONS

"Secure Remote User Mutual Authentication Scheme with Key Agreement for Cloud Environment", Marimuthu Karuppiah, Mobile Networks and Applications, May 19, 2018 (Year: 2018).*
(Continued)

*Primary Examiner* — Duan Zhang
(74) *Attorney, Agent, or Firm* — Rowand LLP

(57) ABSTRACT

A computer-implemented method is disclosed. The method includes: detecting a transaction initiated at a terminal device using the value transfer card; receiving, via the terminal device, input of a first authentication password associated with the value transfer card during a card session that begins when the value transfer card is inserted into the terminal device; identifying at least one first card control setting associated with the first authentication password that defines one or more transaction restrictions; in response to determining that the transaction is not permitted based on the at least one first card control setting: receiving, via the terminal device, input of a second override password associated with the value transfer card during the card session; determining that at least one second card control setting associated with the second override password defines an override condition for disabling the at least one first card control setting for the card session; and processing the transaction based on disabling the at least one first card control setting.

20 Claims, 6 Drawing Sheets

(51) Int. Cl.

| | |
|---|---|
| ***G06Q 20/20*** | (2012.01) |
| ***G06Q 20/22*** | (2012.01) |
| ***G06Q 20/34*** | (2012.01) |
| ***H04L 9/40*** | (2022.01) |

(52) U.S. Cl.
CPC ......... *G06Q 20/206* (2013.01); *G06Q 20/227* (2013.01); *G06Q 20/346* (2013.01); *G06Q 20/4012* (2013.01); *H04L 63/083* (2013.01); *H04L 63/0853* (2013.01); *G06Q 2220/00* (2013.01)

(58) Field of Classification Search
CPC ............. G06Q 20/346; G06Q 20/4012; G06Q 2220/00; G06Q 20/18; G06Q 20/202; G06Q 20/3278; G06Q 20/34; G06Q 20/38215; G06Q 20/385; H04L 63/083; H04L 63/0853; G07F 19/211; H04W 12/63
See application file for complete search history.

(56) References Cited

U.S. PATENT DOCUMENTS

| | | | |
|---|---|---|---|
| 8,152,074 | B1 | 4/2012 | de Jong |
| 8,225,386 | B1 | 7/2012 | de Jong |
| 8,635,159 | B1 | 1/2014 | Cobb et al. |
| 8,707,413 | B2 | 4/2014 | Adams et al. |
| 8,789,753 | B1 | 7/2014 | de Jong |
| 10,262,505 | B1 | 4/2019 | Gopalakrishna et al. |
| 10,803,463 | B1 * | 10/2020 | Barnum ................ H04L 63/108 |
| 10,896,413 | B2 | 1/2021 | Richards et al. |
| 2007/0250920 | A1 * | 10/2007 | Lindsay .................. G06F 21/31 726/7 |
| 2009/0144162 | A1 | 6/2009 | Milne |
| 2009/0216676 | A1 | 8/2009 | Mathur et al. |
| 2010/0243730 | A1 * | 9/2010 | Safahi .................... G06Q 10/00 235/380 |
| 2015/0254645 | A1 | 9/2015 | Bondesen et al. |
| 2018/0268405 | A1 | 9/2018 | Lopez |
| 2019/0019190 | A1 * | 1/2019 | Agrawal ................ G06Q 20/40 |
| 2019/0197522 | A1 | 6/2019 | Jangid et al. |

FOREIGN PATENT DOCUMENTS

| | | | | |
|---|---|---|---|---|
| CN | 105956856 A | * | 9/2019 | ......... G06Q 20/4014 |
| IN | IN0607DEL2014 | | 8/2016 | |
| WO | 0054195 | | 9/2000 | |
| WO | 2013064269 | | 5/2013 | |

OTHER PUBLICATIONS

Jerrya; Somewhat related: I've long wondered why ATM cards don't have something similar. 1234 is my regular PIN. 1235 is my help I'm being robbed PIN—it dispenses the cash, calls the cops, and tags the video. https://news.ycombinator.com/item?id=3426874 Jan. 5, 2012.

* cited by examiner

VALUE TRANSFER CARD MANAGEMENT SYSTEM

TECHNICAL FIELD

This application is a continuation of U.S. patent application Ser. No. 17/016,436 filed on Sep. 10, 2020, the content of which is incorporated herein by reference.

TECHNICAL FIELD

The present application relates to value transfer cards and, more particularly, to systems and methods for processing transactions that are initiated using value transfer cards.

BACKGROUND

Value transfer cards, such as credit cards, may be used by customers for various types of transactions. For example, a value transfer card may enable the cardholder to make purchases at a point-of-sale (e.g. a merchant terminal) or access automatic teller machines (ATMs) for account-related transactions (e.g. deposits, money transfers, cash withdrawals, etc.). Transactions using value transfer cards are typically processed by computing systems that perform backend services relating to authentication, account access and management, and data transfer. It is desirable to configure such computing systems to automatically detect and process a wide range of transactions that may be initiated using value transfer cards.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
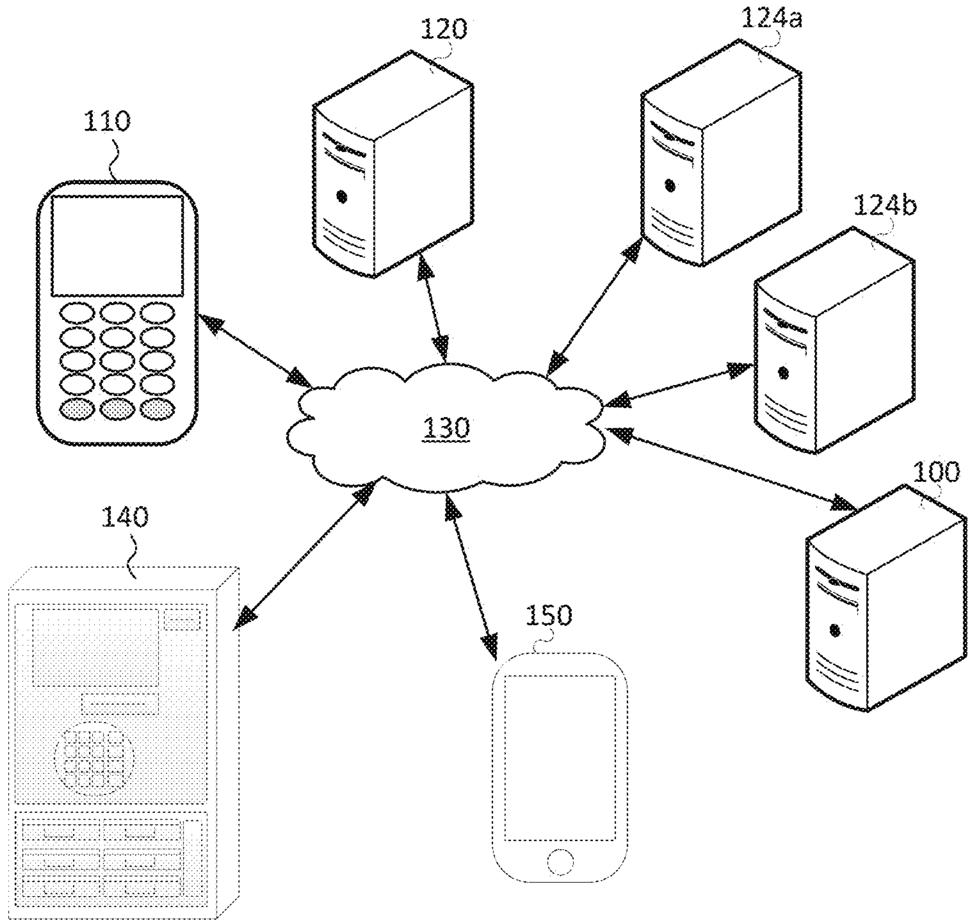
FIG. 1 is a schematic diagram illustrating an operating environment of an example embodiment.

In an aspect, a computing device is disclosed. The computing device includes a processor, a communications module coupled to the processor, and a memory coupled to the processor. The memory stores instructions that, when executed, configure the processor to: receive, via a terminal device, input of a first password during a card session that begins when a value transfer card is inserted into the terminal device, the value transfer card being associated with a plurality of passwords; verify that the first password is a valid password associated with the value transfer card; identify at least one card control setting associated with the first password, the at least one card control setting being a setting that is not associated with another one of the plurality of passwords; and process a transaction initiated at the terminal device based on the identified at least one card control setting.

In some implementations, the terminal device may be one of a point-of-sale terminal or an automated teller machine (ATM).

In some implementations, the first password comprises a personal identification number (PIN).

In some implementations, the at least one card control setting associated with the first password may define one or more transaction limits for transactions that are executed using the value transfer card.

In some implementations, the at least one card control setting associated with the first password may define an override condition for overriding one or more card control settings associated with another one of the plurality of passwords.

In some implementations, the instructions, when executed, may further configure the processor to: receive, via the terminal device, input of a second password subsequent to input of the first password during the card session; verify that the second password is a valid password associated with the value transfer card; identify at least one card control setting associated with the second password; determine that the at least one card control setting associated with the second password defines an override condition for overriding a select one of the card control settings associated with the first password, wherein processing the transaction initiated at the terminal device may include processing the transaction based on overriding the select one of the card control settings associated with the first password.

In some implementations, the override condition may cause the select one of the card control settings associated with the first password to be disabled.

In some implementations, the override condition may indicate a substitute setting, and processing the transaction initiated at the terminal device may include processing the transaction based on applying the substitute setting in place of the select one of the card control settings associated with the first password.

In some implementations, the value transfer card may be associated with a plurality of accounts and the at least one card control setting associated with the first password may indicate an identity of an account that is to be used for the transaction.

In some implementations, the plurality of accounts may include a default currency account and one or more foreign currency accounts.

In another aspect, a processor-implemented method is disclosed. The method includes: receiving, via a terminal device, input of a first password during a card session that begins when a value transfer card is inserted into the terminal device, the value transfer card being associated with a plurality of passwords; verifying that the first password is a valid password associated with the value transfer card; identifying at least one card control setting associated with the first password, the at least one card control setting being a setting that is not associated with another one of the plurality of passwords; and processing a transaction initiated at the terminal device based on the identified at least one card control setting.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Value transfer cards, such as payment cards, can be used for making purchases at a point-of-sale or to access ATMs for account-related transactions. A value transfer card may be connected to one or more accounts (such as banking accounts) that store data and/or resources accessible to the cardholder. For example, a value transfer card may be associated with a primary, or default, account and a number of secondary accounts that can be used for specific transactions (e.g. foreign currency transactions). In particular, the value transfer card may be associated a plurality of accounts that includes a default currency account and one or more foreign currency accounts. Any transaction that is initiated using the value transfer card may access resources of one of the accounts that are connected to the value transfer card.

A value transfer card may be associated with one or more card controls that prevent the cardholder from performing certain actions. In at least some embodiments, the card controls may represent restrictions on the transactions that can be initiated using the value transfer card. By way of example, card controls may define limits (e.g. credit limit, debit limit, etc.) on transaction amounts for transactions using the value transfer card. Any transaction that exceeds the relevant limit on transaction amount may be declined.

Such card controls for a value transfer card may be imposed by an issuer entity, such as a financial institution that issues the card to a customer. The card controls may be useful in preventing, or mitigating potential damages resulting from, fraudulent activities using the value transfer card. In particular, the card controls can make it difficult for unauthorized entities to use the value transfer card to engage in fraudulent transactions. However, such card controls may also sometimes pose difficulties for an authorized entity, such as the cardholder. For example, the cardholder may be prevented from completing desired transactions (e.g. ATM withdrawal, purchase at a POS, etc.) due to card controls that are imposed on the value transfer card. The cardholder may be required to use a different card, manually request override of the card controls, or abandon the transaction altogether.

The present disclosure describes systems and methods for processing transactions using a value transfer card. A system that automatically manages card control settings for a value transfer card is disclosed. The system is capable of detecting override conditions for card controls associated with a value transfer card. More specifically, the system may configure a value transfer card to support multiple passwords, with each password being associated with different set of card controls. A first password supported by the system may impose a first set of card controls, or restrictions, on the use of the value transfer card. The first password may, for example, be a personal identification number (PIN) that is required for using the value transfer card for any transaction. A second, different password that does not have the same set of card controls as the first password is also supported by system. In particular, the second password may be used for disabling the first set of card controls associated with the first password.

The second password, which may be used for overriding the first set of card controls, may be used much less frequently than the first password. As a result, the multi-password support for transactions using the value transfer card may improve transaction and card data security, as the second password may be less likely to become compromised due to infrequency of use.

FIG. 1 is a schematic operation diagram illustrating an operating environment of an example embodiment.

As illustrated, a transfer rail server 120 communicates with remote computing devices via a network 130. The remote computing devices may take a variety of forms. For example, as illustrated, the transfer rail server 120 may communicate with one or more point-of-sale (POS) terminals 110, one or more automated teller machines (ATMs) 140, and/or one or more other computing devices such as, for example, one or more transfer initiation systems 124*a*, 124*b*. The transfer initiation systems 124*a*, 124*b* may be or include, for example, electronic commerce (i.e. e-commerce) systems. An e-commerce system may be, for example, a server associated with an electronic commerce website such as an online store that sells or facilitates the sale of goods and/or services online. The transfer initiation systems 124*a*, 124*b* may, additionally or alternatively, include one or more computer systems that are not e-commerce servers. For example, the transfer initiation systems 124*a*, 124*b* may be or include utility, subscription, or membership computing systems. For example, the transfer initiation systems may include computing devices associated with one or more of: telephone services, internet services, periodicals including magazines and newspapers, club memberships such as fitness memberships, utility services including, for example, water services, gas services, hydro services, etc.

The transfer rail server 120 may be a computing system that facilitates electronic funds transfer and may, in at least some embodiments, be referred to as a payment rail server. By way of example, the transfer rail server 120 may be a Visa™, Mastercard™, or American Express™ server. The transfer rail server 120 may be associated with a particular brand of value transfer cards. More particularly, the transfer rail server 120 may facilitate payment processing for a particular brand of value transfer card, such as a particular brand of credit and/or charge card. By way of example, in some embodiments, the transfer rail server 120 may only process Visa transactions. The transfer rail server 120 may also, in at least some embodiments, be referred to as a credit card network server.

The transfer rail server 120 communicates with a computing system, such as an issuer computing system 100. The issuer computing system 100 may be, for example, a computer system associated with a financial institution, such as a bank, that issued a credit and/or charge card. Put differently, the issuer computing system 100 is associated with a value transfer card issuer. For example, the issuer computing system 100 may be operated or managed by the value transfer card issuer.

A value transfer card may be or include a payment card (e.g. a credit card, a charge card, etc.). The value transfer card may have certain associated data. For example, the value transfer card may be associated with a primary account number (PAN), a verification number such as a credit card verification (CCV) number, and/or an expiry date. The value transfer card may be used by the point-of-sale terminal 110 or another transfer initiation system 124*a*, 124*b* for processing a transfer of value from a cardholder to an entity associated with such systems. The value transfer card may also be used for transactions at an ATM 140. For example, the value transfer card may be inserted into an ATM 140 to start a card session. Upon verification of the cardholder's identity, the cardholder may engage in various transactions (e.g. cash withdrawal, bill payments, check deposits, etc.) that are available to be performed at the ATM 140.

In order to process a transfer of value using the value transfer card, a POS terminal or other transfer initiation system 124*a*, 124*b* may communicate with the transfer rail server 120. For example, the transfer initiation system 124*a*, 124*b* may send, to the transfer rail server 120, a transfer request. The transfer request may specify, for example, an amount of value associated with the request. The transfer request may also include or be associated with one or more credentials associated with a value transfer card. The credentials may include, for example, the PAN, expiry date, and/or verification number for the value transfer card. Other metadata may also be included in the transfer request such as, for example, an entity identifier such as a merchant identifier, location information specifying a location at which the transfer initiation system 124*a*, 124*b* purports to be located, and/or other information.

The credentials may take other forms. For example, the credentials may include a token. A token may be a non-decryptable piece of data that is used to represent, by reference, value transfer card data. Tokens may be issued by a tokenization service, which may be included in the transfer rail server 120 or may be a separate system. The tokenization service and/or the transfer rail server 120 stores a mapping of a token to associated information such as, for example, value transfer card data. For example, the token may be mapped to one or more of an account number such as a PAN, a date (e.g. expiry date), verification data (e.g. CCV number), and/or a token holder. The token holder may identify an entity that the token was issued to and/or is associated with. The entity may, for example, be the transfer rail server 120. For example, the transfer rail server 120 may permit one or more third party systems (e.g. the transfer initiation system 124*a*, 124*b*) to obtain and store a token for a particular value transfer card. The token is a representation of the value transfer card and may be stored by the transfer initiation system 124*a*, 124*b* for future use in issuing value transfer requests. The token may be unique to the entity to which it is issued. That is, different entities that receive tokens for the same value transfer card may receive different tokens, and the transfer rail server 120 and/or the tokenization service may track which entity received which token so that an entity that issued a value transfer request that includes a token may be identified.

After the transfer rail server 120 receives a value transfer request, it may communicate with an issuer computing system 100 to request approval of the value transfer request. The request for approval may include, for example, information included in or obtained from the value transfer request, such as the amount of the value transfer request. The request for approval may include information determined based on the token. For example, the PAN may be included in the request. The transfer rail server 120 receives a response to the request for approval (e.g., either an indication of approval or an indication of denial) and sends a corresponding message to the transfer initiation system 124*a*, 124*b*.

Accordingly, a transfer initiation system 124*a*, 124*b* may use a credential associated with a value transfer card in order to initiate a transfer. In some instances, the transfer initiation system 124*a*, 124*b* may store the credential for future use. For example, the value transfer initiation system 124*a*, 124*b* may store a representation of a value transfer card in a memory associated with the value transfer initiation system 124*a*, 124*b*. The representation of the value transfer card may either be a "card-on-file" representation of the value transfer card or a tokenized representation of the value transfer card. In the card-on-file representation, the value transfer initiation system 124*a*, 124*b* stores the PAN, expiry date and, in some instances, the verification information associated with the value transfer card. In the tokenized representation, the value transfer initiation system 124*a*, 124*b* stores a token of the type referred to above.

As card holders use their value transfer card with various third-party entities, representations of the value transfer card may be stored at numerous locations. While two transfer initiation systems 124*a*, 124*b* are illustrated in FIG. 1, the number of transfer initiation systems 124*a*, 124*b* having a stored representation of the value transfer card may be much greater.

The issuer computing system 100 may communicate with a client device 150 via the network 130 in order to allow the client device 150 to be used in managing a value transfer card. More specifically, the issuer computing system 100 and the client device 150 may cooperate to provide a card management user interface on an output device, such as a display, of the client device 150. A user may interact with the card management user interface in order to input instructions to the client device 150. At least some such instructions may cause the client device 150 to send a management request or command to the issuer computing system 100.

The management request or command may take various forms. For example, in some instances, the management request or command may be an instruction to apply one or more card control settings to selected accounts. The card control settings for a value transfer card are controls (or restrictions) that are imposed on transactions which may be initiated using the value transfer card. The card controls may be applied in real-time on a per-account and/or per-card basis when processing transaction requests associated with the value transfer card.

Other management features and functions may also be provided by the management user interface.

The client device 150 may also include a stored representation of the value transfer card. For example, a token may be stored in secure memory of the client device 150 to allow the client device 150 to be used in initiating a transaction, such as a transfer of value. For example, the client device may include a near field communication (NFC) subsystem which may be used to send a token to the POS terminal 110 in order to initiate or complete a transaction.

The issuer computing system 100, point-of-sale terminal 110, ATM 140, client device 150, transfer initiation systems 124*a*, 124*b*, and the transfer rail server 120 may be in geographically disparate locations. Put differently, each of the issuer computing system 100, point-of-sale terminal 110, ATM 140, client device 150, transfer initiation systems 124*a*, 124*b*, and the transfer rail server 120 may be remote from others of the issuer computing system 100, client device 150, transfer initiation systems 124*a*, 124*b*, and the transfer rail server 120.

The issuer computing system 100, point-of-sale terminal 110, ATM 140, client device 150, transfer initiation systems 124*a*, 124*b*, and the transfer rail server 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
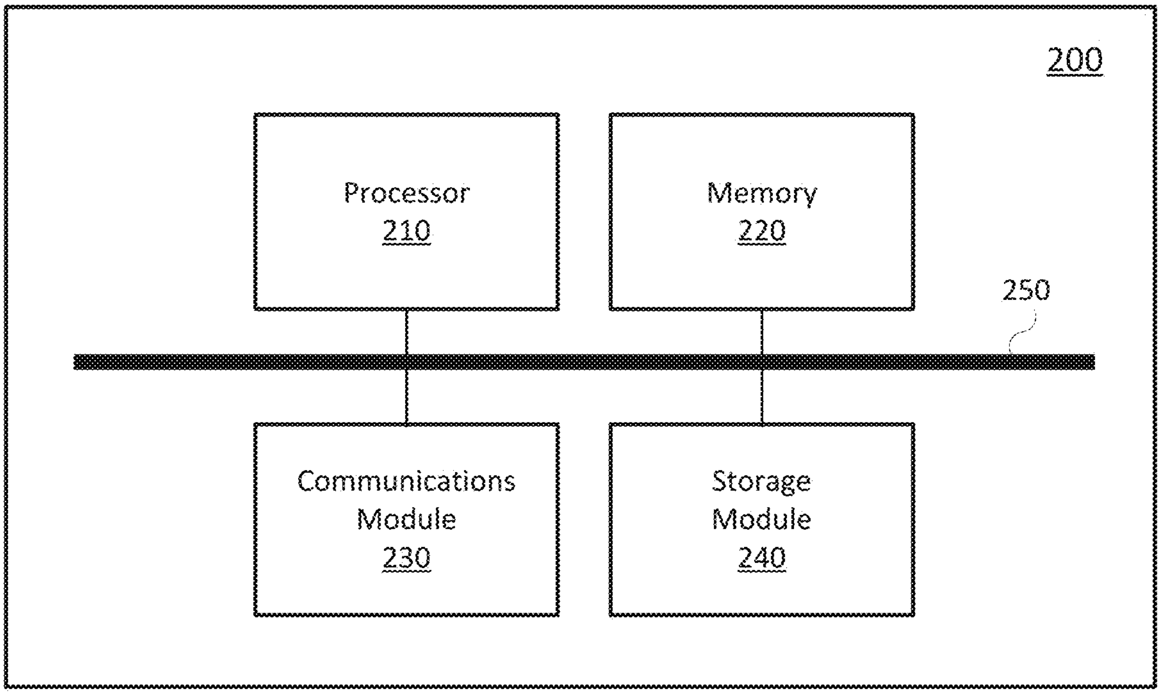
FIG. 2 is high-level schematic diagram of a computing device.

Referring now to FIG. 2, a high-level operation diagram of an example computing device 200 will now be described. The example computing device 200 may be exemplary of the issuer computing system 100, point-of-sale terminal 110, ATM 140, client device 150, transfer initiation systems 124*a*, 124*b*, and/or the transfer rail server 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer computing system 100, point-of-sale terminal 110, client device 150, transfer initiation systems 124*a*, 124*b*, and the transfer rail server 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
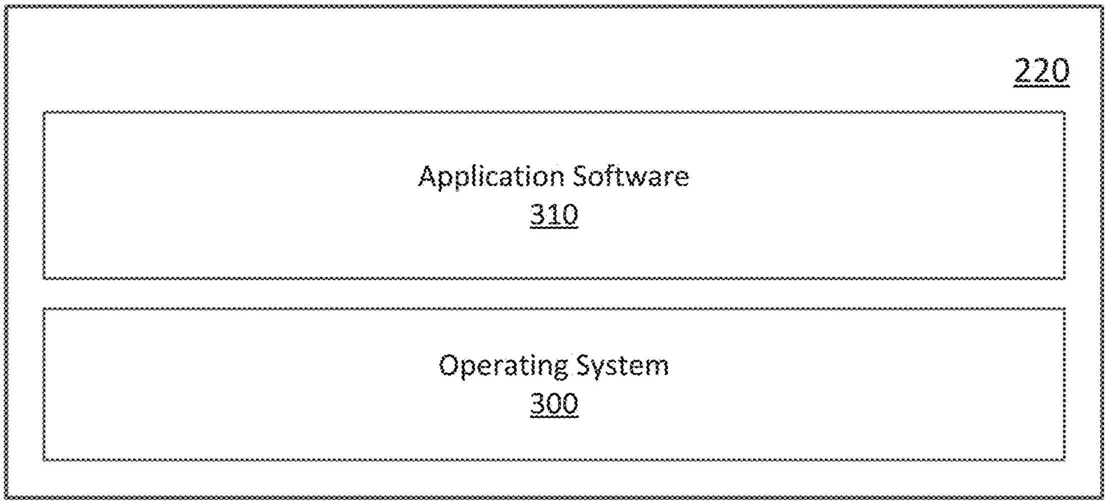
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer computing system 100, point-of-sale terminal 110, client device 150, transfer initiation systems 124*a*, 124*b*, or the transfer rail server 120.

While a single application software 310 is illustrated in FIG. 3, in operation the memory 220 may include more than one application software 310 and different application software 310 may perform different operations.

Figure 4:
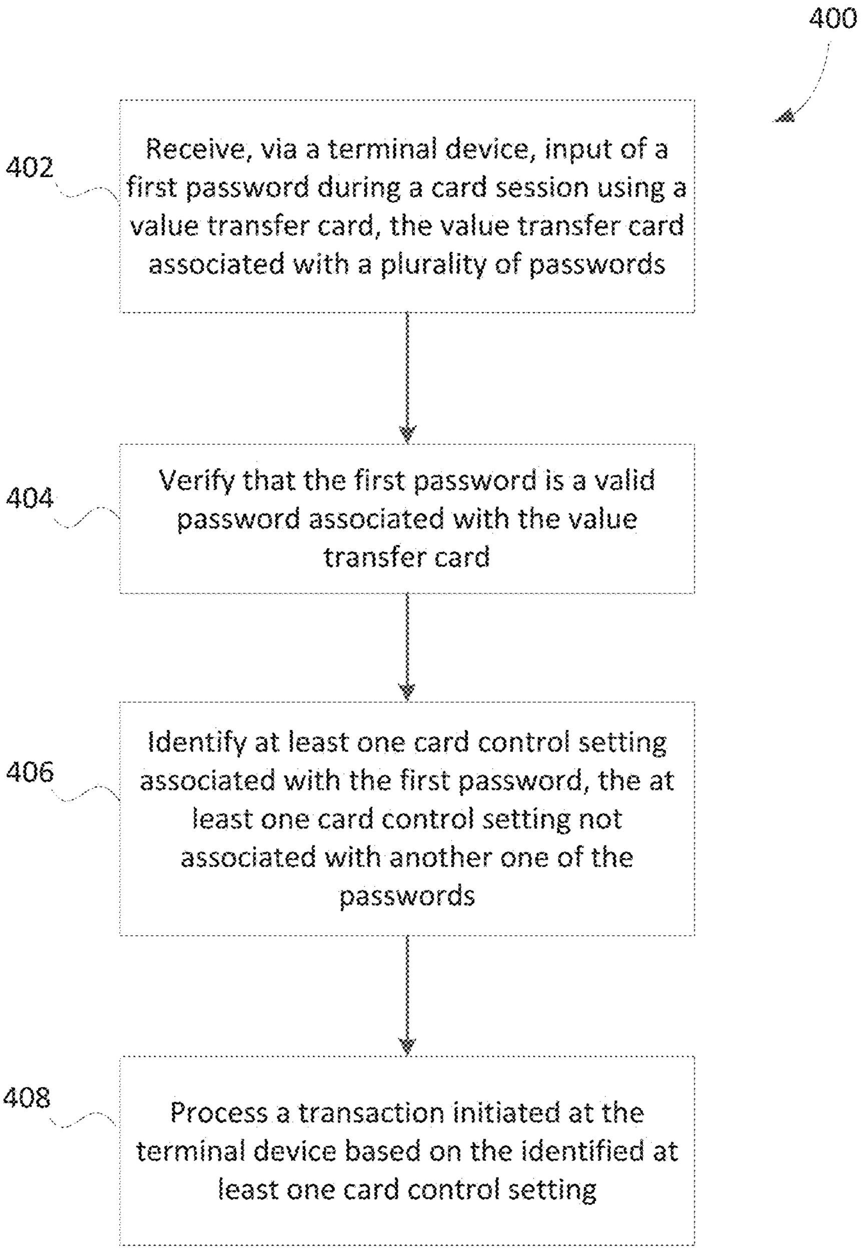
FIG. 4 shows, in flowchart form, an example method for processing a transaction that is initiated using a value transfer card.

Reference is now made to FIG. 4, which shows, in flowchart form, an example method 400 for processing a transaction using a value transfer card. The method 400 may be implemented by a transaction processing system. More specifically, a system with multi-password support for value transfer cards may implement the method 400 as part of its processing of transactions that are initiated using the value transfer cards.

Operations starting with operation 402 and continuing onward are performed by the processor 210 (FIG. 2) of a computing device 200 executing software comprising instructions such as may be stored in the memory 220 of the computing device 200. For example, the operations of the method 400 may be performed by the issuer computing system 100. More particularly, processor-executable instructions may, when executed, configure a processor 210 of the issuer computing system 100 to perform the method 400. In some embodiments, the operations of method 400 may be performed by the issuer computing system 100 in conjunction with one or more other computing systems, such as the payment rail server 120.

In operation 402, the issuer computing system receives, via a terminal device, input of a first password during a card session that begins when a value transfer card is inserted into the terminal device. The terminal device may, for example, be a point-of-sale (POS) terminal that is provided by a merchant. When the cardholder desires to make a purchase (e.g. in-store purchase) from a merchant, the value transfer card may be inserted into the POS terminal, starting a card session. The cardholder may be prompted to enter a password for authentication purposes.

As another example, the terminal device may be an automated teller machine (ATM). The cardholder may insert the value transfer card into an ATM and input a password, such as a personal identification number (PIN), that is associated with the value transfer card or an account (e.g. banking account) that is connected to the value transfer card.

In operation 404, the issuer computing system verifies that the inputted first password is a valid password associated with the value transfer card. The issuer computing system may itself maintain, or have access to, a database storing card data for value transfer cards that are issued by the issuing entity, such as a financial institution. For example, the issuer entity may be a bank, and the issuer computing system may store card data for the value transfer cards that are issued by the bank. The stored card data may include, for each issued value transfer card, card identifier, identifying information for the cardholder, account identifiers for accounts that are connected to the card, passwords for authorized use of the card, and card control settings associated with the passwords for the card. In particular, the stored card data may indicate mappings of the card control settings to the passwords.

The issuer computing system may verify the first password by querying the database storing card data for the issued value transfer cards. In particular, the issuer computing system may compare the inputted first password with passwords (e.g. PIN for the card, password for accounts connected to the card, etc.) on record for the value transfer card and determine whether there is a match. In some embodiments, the inputted password may be encrypted prior to being received at the issuer computing system. For example, a PIN that is inputted at an ATM may be encrypted, and the encrypted PIN may be transmitted to the issuer computing system.

In operation 406, the issuer computing system identifies at least one card control setting associated with the first password. The at least one card control setting is a setting that is not associated with another one of the plurality of passwords. That is, the card control setting is uniquely associated with the first password. Examples of card control settings include, but are not limited to: transaction limits (e.g. credit limit, debit limit, limit on number of transactions, etc.), which may be defined on a per-transaction basis or on a per-time period basis; types and categories of permitted transactions; permitted channels of transactions; and geographic location of permitted transactions.

The card control settings associated with passwords for a value transfer card may be defined by an authorized entity, such as the card issuer entity or cardholder. The card control settings may also be updated, such that the passwords may be associated with different card controls with updates by the authorized entity.

In operation 408, the issuer computing system processes the transaction initiated at the terminal device based on the identified at least one card control setting associated with the first password. In at least some embodiments, the issuer computing system renders an approval decision for the transaction based on the at least one card control setting. In particular, the issuer computing system renders a decision to approve the transaction if the properties of the transaction do not violate the at least one card control setting. For example, if the first password is associated with a transaction limit (e.g. credit/debit limit) and the transaction amount for the transaction does not exceed said limit, the transaction may be approved. If a transaction is approved, the issuer computing system may process suitable debit or credit actions for the account associated with the value transfer card.

On the other hand, if the properties of the transaction violate at least one of the card control settings, the transaction may be denied. In particular, the issuer computing system may render a transaction declined decision, which may be transmitted for display on a computing device (e.g. a merchant's POS terminal, an ATM, etc.).

Figure 5:
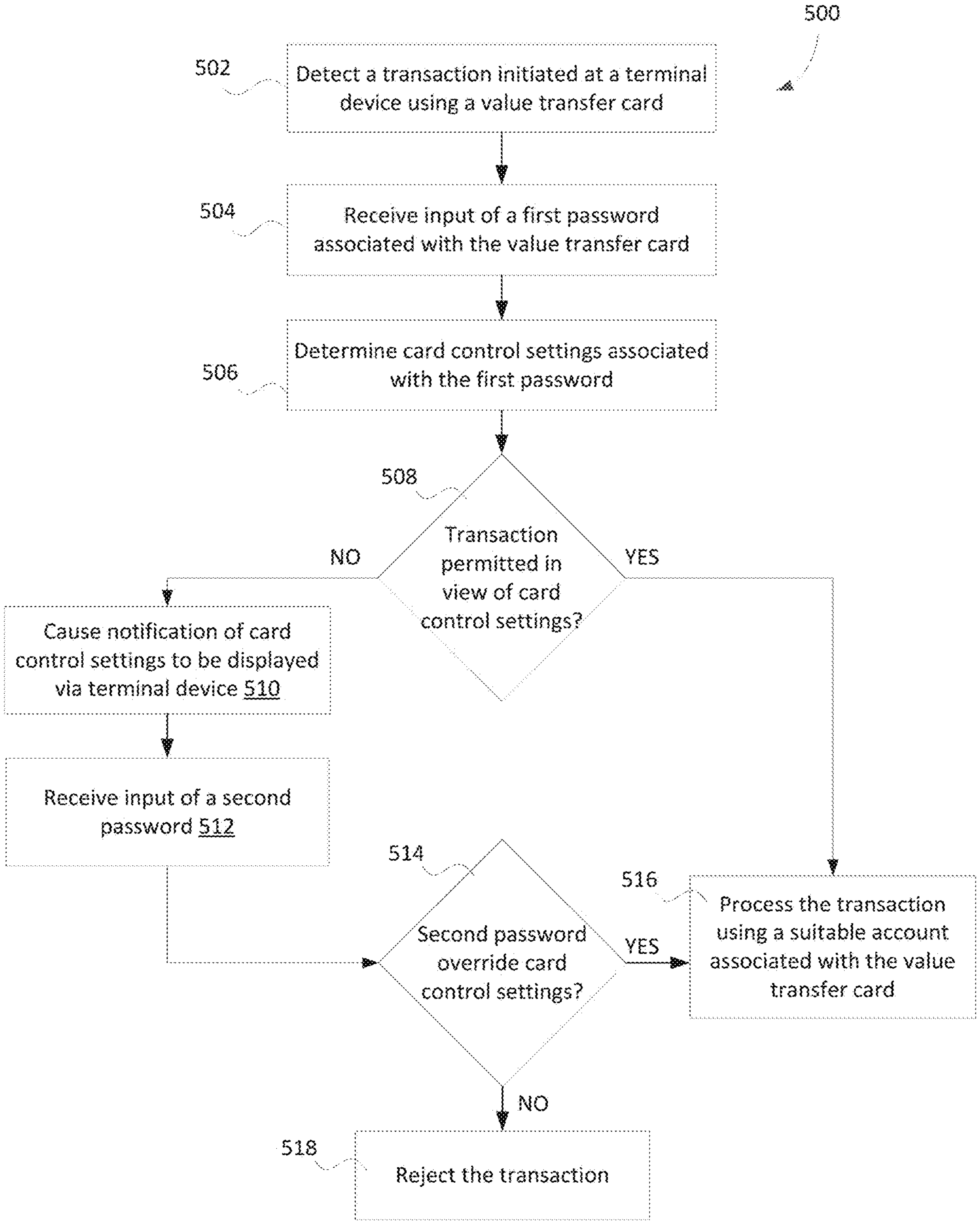
FIG. 5 shows, in flowchart form, another example method for processing a transaction that is initiated using a value transfer card.

Reference is now made to FIG. 5, which shows, in flowchart form, an example method 500 for facilitating a transaction using a value transfer card. The method 500 may be implemented by a transaction processing system.

Operations starting with operation 502 and continuing onward are performed by the processor 210 (FIG. 2) of a computing device 200 executing software comprising instructions such as may be stored in the memory 220 of the computing device 200. For example, the operations of the method 500 may be performed by the issuer computing system 100. More particularly, processor-executable instructions may, when executed, configure a processor 210 of the issuer computing system 100 to perform the method 500. In some embodiments, the operations of method 500 may be performed by the issuer computing system 100 in conjunction with one or more other computing systems, such as the payment rail server 120. The operations of method 500 may be performed in addition to, or as alternatives, to one or more of the operations of method 400.

In operation 502, the issuer computing system detects a transaction initiated at a terminal device using a value transfer card. The terminal device may, for example, be a POS terminal or an ATM. The issuer computing system may detect a transaction when a transaction request is received by the issuer computing system. The transaction request may, for example, be a request to process a purchase at a merchant's POS or an ATM action. In some embodiments, the transaction request may be transmitted to the issuer computing system via a payment rail server.

In operation 504, the issuer computing system receives input of a first password associated with the value transfer card. For example, the card user may input a password, such as a PIN, into an ATM upon inserting the value transfer card in an ATM to begin a card session. As another example, the card user may insert the value transfer card into a POS terminal of a merchant and input a password into the terminal.

In operation 506, the issuer computing system determines card control settings associated with the first password. Once input of the first password is received, the issuer computing system determines whether there are any card control settings corresponding to the inputted first password. As explained above, card control settings may represent restrictions on use of the value transfer card for transactions. For example, the first password may be associated with a limit on transaction amount (e.g. credit/debit limit) that is defined for the value transfer card.

In operation 508, the issuer computing system determines whether the transaction is permitted in view of the card control settings associated with the inputted first password. In particular, the issuer computing system determines whether the properties of the transaction violate any of the card control settings. If the transaction is permitted, the transaction is processed using a suitable account associated with the value transfer card, in operation 516. For example, the issuer computing system may cause the transaction amount to be withdrawn or charged to an account (e.g. primary account) that is connected to the value transfer card. In the context of an ATM transaction, the requested action (e.g. cash withdrawal) may be approved and the issuer computing system may allow the ATM to process the requested action.

If, on the other hand, the transaction is not permitted in view of the card control settings, the issuer computing system causes notification of card control settings to be displayed via the terminal device in operation 510. For example, if the transaction is a requested ATM action, such as cash withdrawal, the issuer computing system may cause a message indicating the card control settings to be displayed via the ATM. Such message may indicate, for example, that the requested transaction has been declined, and that it violates one or more of the card control settings associated with the inputted first password for the value transfer card.

Subsequent to display of the card control settings, the issuer computing system may receive input of a second password in operation 512. For example, upon display of a notification message indicating the card control settings, the card user may input a second password. This second password may be a password which overrides the card controls imposed on the value transfer card. In particular, a card control setting associated with the second password may define an override condition for overriding a select one (or more) of the card control settings associated with the first password. By way of example, the first password may be associated with a first transaction amount limit defining a maximum amount of transfer of value using the value transfer card. The second password may be associated with a second transaction amount limit that is higher than the first transaction amount limit. (Alternatively, the second password may have no associated transaction amount limit, which still overrides the first limit condition.) More generally, the second inputted password may be a password that removes, or disables, one or more card controls that are associated with at least one other password for the value transfer card.

The issuer computing system may verify that the inputted second password is a valid password associated with the value transfer card. Upon successful verification of the second password, the issuer computing system determines whether the second password is configured for overriding select ones of the card control settings associated with the first password, in operation 514. If so, the transaction is processed using a suitable account associated with the value transfer card, in operation 516. In particular, the transaction is processed based on overriding the select ones of the card control settings associated with the first password that was inputted for the value transfer card.

In some embodiments, the card control setting associated with the second password may define an override condition that indicates a substitute setting. The transaction may be processed based on applying the substitute setting in place of the select one(s) of the card control settings associated with the first password. For example, the second password may be associated with a second transaction amount limit that is higher than a first transaction amount limit for the first password. Upon receipt of the second password, subsequent transactions may be processed by the issuer computing system based on enforcing the second transaction amount limit. A transaction with an associated transaction amount that exceeds the second transaction amount limit may thus be declined.

If the inputted second password does not override the card control settings associated with the first password, the transaction is rejected, or declined, in operation 518.

Figure 6:
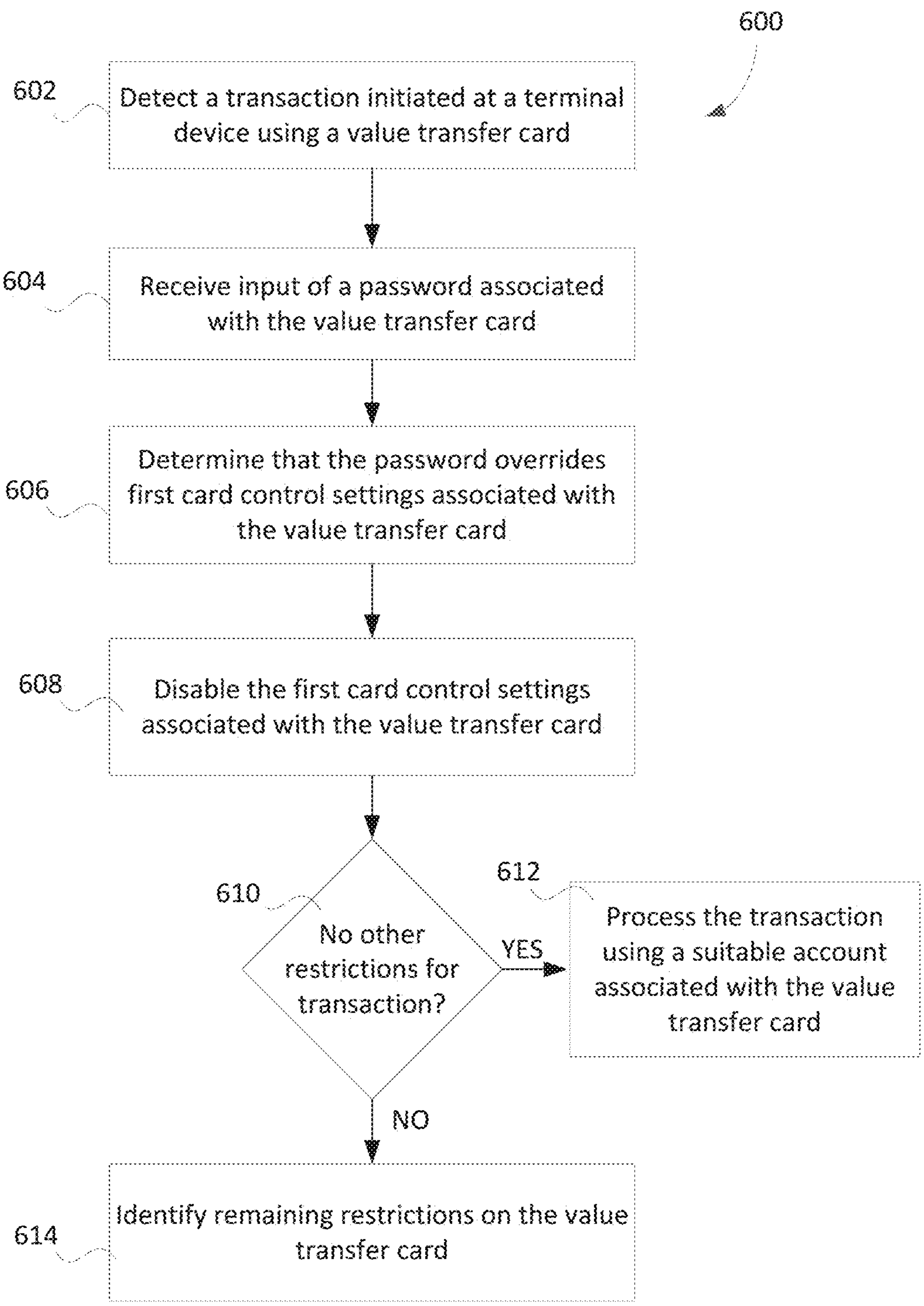
FIG. 6 shows, in flowchart form, another example method for processing a transaction that is initiated using a value transfer card.

Reference is now made to FIG. 6, which shows, in flowchart form, an example method for facilitating a transaction using a value transfer card. The method 600 may be implemented by a transaction processing system.

Operations starting with operation 602 and continuing onward are performed by the processor 210 (FIG. 2) of a computing device 200 executing software comprising instructions such as may be stored in the memory 220 of the computing device 200. For example, the operations of the method 600 may be performed by the issuer computing system 100. More particularly, processor-executable instructions may, when executed, configure a processor 210 of the issuer computing system 100 to perform the method 600. In some embodiments, the operations of method 500 may be performed by the issuer computing system 100 in conjunction with one or more other computing systems, such as the payment rail server 120. The operations of method 600 may be performed in addition to, or as alternatives, to one or more of the operations of methods 400 and 500.

In operation 602, the issuer computing system detects a transaction initiated at a terminal device using the value transfer card. The operation 602 may be performed in a similar manner as operation 502 of method 500. In particular, the issuer computing system may detect a transaction when a request to process a transaction using the value transfer card is received by the issuer computing system from a terminal device (e.g. merchant POS, ATM, etc.).

In operation 604, the issuer computing system receives input of a password associated with the value transfer card. This password may be inputted for overriding card controls that are previously imposed for the value transfer card. That is, the value transfer card may be previously associated with defined card controls, and input of the password may be the action that overrides said card controls. The card controls may, for example, be defined by an authorized entity associated with the value transfer card (e.g. card issuer entity). In operation 606, the issuer computing system determines that the inputted password overrides first card control settings associated with the value transfer card. The issuer computing system then disables the first card control settings associated with the value transfer card, in operation 608.

If the issuer computing system determines, in operation 610, that there are no other restrictions for the transaction (i.e. restrictions preventing the transaction have been disabled by input of the password), the issuer computing system processes the transaction using a suitable account associated with the value transfer card, in operation 612. For example, the issuer computing system may render a decision to approve the transaction and transmit the decision for display on the merchant terminal or ATM. When processing the transaction, the issuer computing system may cause the transaction amount to be withdrawn or charged to an account (e.g. primary account) that is connected to the value transfer card.

On the other hand, if there are further restrictions that are not disabled by input of the password, the issuer computing system may proceed to identify those remaining restrictions/card controls on the value transfer card, in operation 614.

Figure 7:
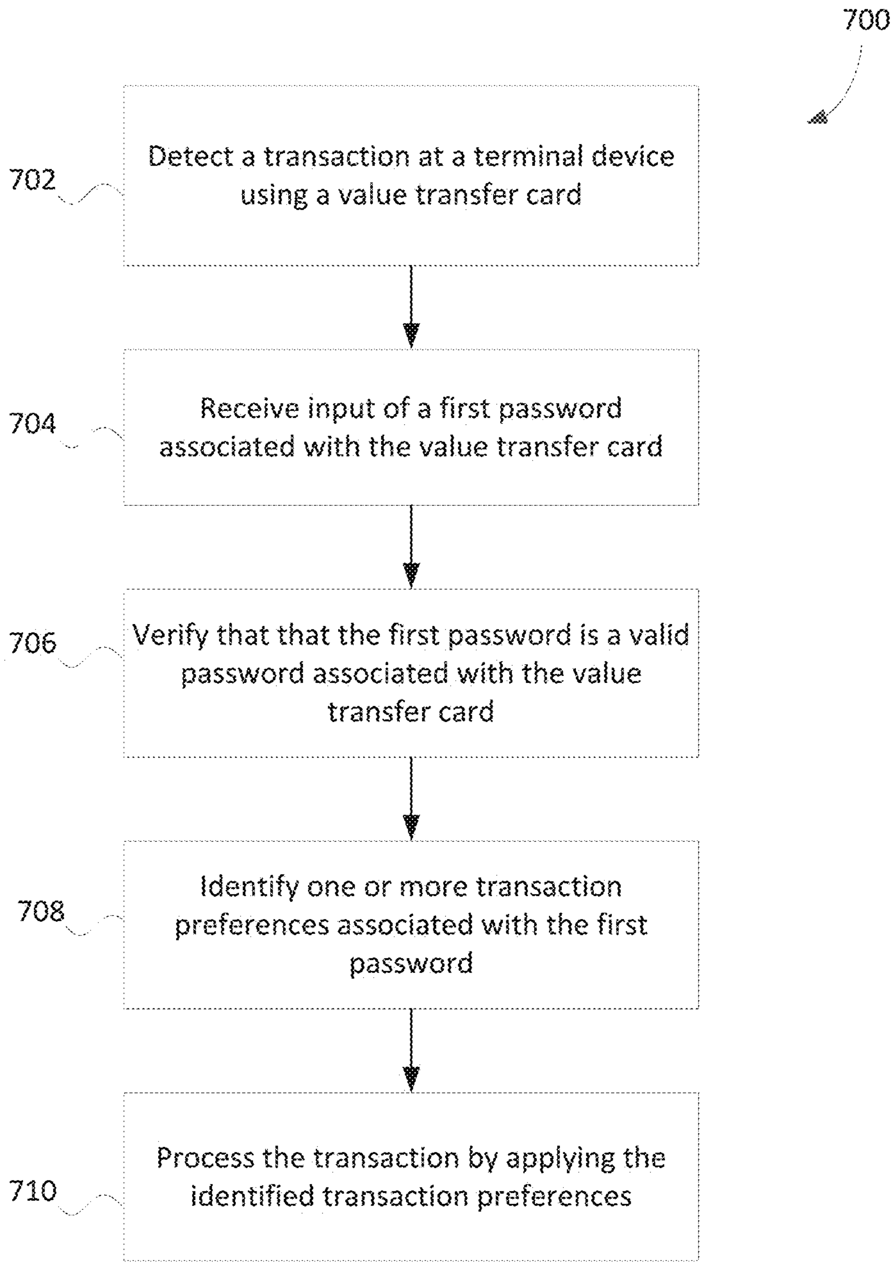
FIG. 7 shows, in flowchart form, an example method for enabling preferences associated with a value transfer card.

Reference is now made to FIG. 7, which shows, in flowchart form, an example method for facilitating a transaction using a value transfer card. The method 700 may be implemented by a transaction processing system.

Operations starting with operation 702 and continuing onward are performed by the processor 210 (FIG. 2) of a computing device 200 executing software comprising instructions such as may be stored in the memory 220 of the computing device 200. For example, the operations of the method 700 may be performed by the issuer computing system 100. More particularly, processor-executable instructions may, when executed, configure a processor 210 of the issuer computing system 100 to perform the method 700. In some embodiments, the operations of method 700 may be performed by the issuer computing system 100 in conjunction with one or more other computing systems, such as the payment rail server 120. The operations of method 700 may be performed in addition to, or as alternatives, to one or more of the operations of methods 400, 500, and 600.

The present disclosure also provides for methods for enabling or disabling transaction preferences in association with transactions using value transfer cards. An example of a transaction preference is choice of an account to engage for a transaction. For example, in the case of a purchase transaction at a POS, a transaction preference may be the choice of account to charge for the amount of the transaction. In operation 702, the issuer computing system detects a transaction at a terminal device using a value transfer card. The transaction may be detected, for example, when a request to process a transaction is received from a terminal, such as a merchant POS or ATM.

In operation 704, the issuer computing system receives input of a first password associated with the value transfer card. The first password may be inputted by the cardholder into a merchant POS terminal or an ATM during a card session. The issuer computing system verifies that the first password is a valid password associated with the value transfer card, in operation 706.

In operation 708, the issuer computing system identifies at least one transaction preference associated with the inputted first password. That is, input of the first password may represent an indication of a desired setting or preference for the transaction. In some embodiments, different passwords may be used for engaging different accounts that are connected to the value transfer card. A single card may be connected to multiple accounts (such as multiple currency accounts), including a primary or default account and one or more secondary accounts. For example, a value transfer card may be connected to at least a default currency account and one or more foreign currency accounts. Each such account may be associated with a different password (e.g. PIN). Depending on the password that is inputted when the value transfer card is used for a transaction, the account corresponding to the inputted password may be engaged for the transaction. Thus, the choice of password effectively serves to control which of the accounts that are connected to the value transfer card is to be used for the transaction.

In operation 710, the issuer computing system processes the transaction by applying the identified at least one transaction preference. By way of example, the issuer computing system may determine an identity of an account that is selected via input of the first password, and the selected account may be engaged for the transaction.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computing device, comprising:
- a processor; and
- a memory coupled to the processor, the memory storing computer-executable instructions that, when executed by the processor, configure the processor to:
  - detect a transaction initiated at a terminal device using a value transfer card;
  - receive, via the terminal device, input of a first authentication password associated with the value transfer card during a card session that begins when the value transfer card is inserted into the terminal device;
  - identify at least one first card control setting associated with the first authentication password that defines one or more transaction restrictions;
  - in response to determining that the transaction is not permitted based on the at least one first card control setting:
    - receive, via the terminal device, input of a second override password associated with the value transfer card during the card session;
    - determine that at least one second card control setting associated with the second override password defines an override condition for disabling the at least one first card control setting for the card session; and
    - process the transaction based on disabling the at least one first card control setting.

2. The computing device of claim 1, wherein the terminal device comprises one of a point-of-sale (POS) terminal or an automated teller machine (ATM).

3. The computing device of claim 1, wherein the first authentication password comprises a personal identification number (PIN).

4. The computing device of claim 1, wherein the at least one first card control setting defines one or more transaction limits for transactions that are executed using the value transfer card.

5. The computing device of claim 1, wherein the input of the second override password is received subsequent to the input of the first authentication password during the card session.

6. The computing device of claim 1, wherein the input of the second override password is received subsequent to display of the at least one card control setting on the terminal device during the card session.

7. The computing device of claim 1, wherein the instructions, when executed, configure the processor to verify that the second override password is a valid password associated with the value transfer card, and wherein the at least one second card control setting associated with the second override password is determined to define the override condition in response to successful verification of the second override password.

8. The computing device of claim 1, wherein the override condition indicates a substitute setting, and wherein processing the transaction comprises applying the substitute setting in place of one of the first card control settings associated with the first authentication password.

9. The computing device of claim 1, wherein the value transfer card is associated with a plurality of accounts and wherein the at least one first card control setting associated with the first authentication password indicates an identity of an account that is to be used for the transaction.

10. The computing device of claim 9, wherein the plurality of accounts includes a default currency account and one or more foreign currency accounts.

11. A computer-implemented method, comprising:

detecting a transaction initiated at a terminal device using the value transfer card;

receiving, via the terminal device, input of a first authentication password associated with the value transfer card during a card session that begins when the value transfer card is inserted into the terminal device;

identifying at least one first card control setting associated with the first authentication password that defines one or more transaction restrictions;

in response to determining that the transaction is not permitted based on the at least one first card control setting:

receiving, via the terminal device, input of a second override password associated with the value transfer card during the card session;

determining that at least one second card control setting associated with the second override password defines an override condition for disabling the at least one first card control setting for the card session; and processing the transaction based on disabling the at least one first card control setting.

12. The method of claim 11, wherein the terminal device comprises one of a point-of-sale (POS) terminal or an automated teller machine (ATM).

13. The method of claim 11, wherein the first authentication password comprises a personal identification number (PIN).

14. The method of claim 11, wherein the at least one first card control setting defines one or more transaction limits for transactions that are executed using the value transfer card.

15. The method of claim 11, wherein the input of the second override password is received subsequent to the input of the first authentication password during the card session.

16. The method of claim 11, wherein the input of the second override password is received subsequent to display of the at least one card control setting on the terminal device during the card session.

17. The method of claim 11, wherein the instructions, when executed, configure the processor to verify that the second override password is a valid password associated with the value transfer card, and wherein the at least one second card control setting associated with the second override password is determined to define the override condition in response to successful verification of the second override password.

18. The method of claim 11, wherein the override condition indicates a substitute setting, and wherein processing the transaction comprises applying the substitute setting in place of one of the first card control settings associated with the first authentication password.

19. The method of claim 11, wherein the value transfer card is associated with a plurality of accounts and wherein the at least one first card control setting associated with the first authentication password indicates an identity of an account that is to be used for the transaction.

20. The method of claim 19, wherein the plurality of accounts includes a default currency account and one or more foreign currency accounts.

* * * * *